United States Patent
Van Gaasbeck

(10) Patent No.: US 10,416,904 B1
(45) Date of Patent: Sep. 17, 2019

(54) METHOD AND SYSTEM FOR RECOVERING STORAGE OBJECT RECORDS IN SOLID STATE MEMORY

(71) Applicant: EMC IP Holding Company LLC, Hopkinton, MA (US)

(72) Inventor: Richard H. Van Gaasbeck, Mountain View, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 341 days.

(21) Appl. No.: 15/394,984

(22) Filed: Dec. 30, 2016

(51) Int. Cl.
*G06F 3/06* (2006.01)
*G06F 12/02* (2006.01)

(52) U.S. Cl.
CPC ............ *G06F 3/0619* (2013.01); *G06F 3/061* (2013.01); *G06F 3/0655* (2013.01); *G06F 3/0688* (2013.01); *G06F 12/0246* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 7,634,627 B1* | 12/2009 | Ohr | | G06F 11/1451 707/999.202 |
| 8,041,884 B2 | 10/2011 | Chang | | |
| 8,300,823 B2* | 10/2012 | Bojinov | | G06F 3/0608 380/269 |
| 8,364,652 B2* | 1/2013 | Vijayan | | G06F 3/0608 707/692 |
| 8,700,840 B2 | 4/2014 | Paley et al. | | |
| 8,891,303 B1 | 11/2014 | Higgins et al. | | |
| 2007/0168633 A1* | 7/2007 | English | | H04L 67/1097 711/165 |
| 2009/0168505 A1 | 7/2009 | Hanzawa et al. | | |
| 2009/0198882 A1* | 8/2009 | Ji | | G06F 12/0246 711/109 |
| 2010/0172180 A1 | 7/2010 | Paley et al. | | |
| 2011/0299317 A1 | 12/2011 | Shaeffer et al. | | |
| 2012/0113779 A1* | 5/2012 | Oh | | G06F 3/0607 369/47.15 |

(Continued)

OTHER PUBLICATIONS

Qureshi et al.; "Enhancing Lifetime and Security of PCM-Based Main Memory with Start-Gap wear Leveling"; IBM Research, T.J. Watson Research Center; {moinqureshi, franceschini, viji, lastrasl, abali, karidis}@us.ibm.com; 10 pages.

*Primary Examiner* — Charles Rones
*Assistant Examiner* — Hewy H Li
(74) *Attorney, Agent, or Firm* — Chamberlain, Hrdlicka, White, Williams & Aughtry

(57) ABSTRACT

A method for recovering storage object records in solid state memory. The method includes, for each memory location of a solid state memory region, reading data fragment metadata and identifying, based on the data fragment metadata, a storage object. The storage object occupies a subset of memory locations of the memory locations of the solid state memory region. The method further includes identifying a first and a last memory location of the subset of memory locations, and restoring a storage object record for the storage object, wherein the storage object record comprises variables that enable a logical to physical address translation for the storage object.

17 Claims, 11 Drawing Sheets

(56) References Cited

U.S. PATENT DOCUMENTS

| | | |
|---|---|---|
| 2014/0219034 A1 | 8/2014 | Gomez et al. |
| 2014/0226413 A1 | 8/2014 | Gomez et al. |
| 2014/0304456 A1* | 10/2014 | Narasimha .......... G06F 12/0246 711/103 |
| 2014/0369124 A1 | 12/2014 | Moon et al. |
| 2015/0221358 A1 | 8/2015 | Brandl |
| 2016/0027481 A1 | 1/2016 | Hong |
| 2016/0148700 A1 | 5/2016 | Oh |
| 2018/0046576 A1* | 2/2018 | Lesartre .............. G06F 12/0893 |

* cited by examiner

| | Physical Address | | | | | |
|---|---|---|---|---|---|---|
| | 0 | 1 | 2 | 3 | 4 | 5 |
| Wear Level Operations ↓ | 0 | 1 | 2 | 3 | 4 | Gap (5) |
| | 0 | 1 | 2 | 3 | Gap (4) | 4 |
| | 0 | 1 | 2 | Gap (3) | 3 | 4 |
| | 0 | 1 | Gap (2) | 2 | 3 | 4 |
| | 0 | Gap (1) | 1 | 2 | 3 | 4 |
| | Gap (0) | 0 | 1 | 2 | 3 | 4 |
| | 4 | 0 | 1 | 2 | 3 | Gap (4) |
| | 4 | 0 | 1 | 2 | Gap (3) | 3 |
| | 4 | 0 | 1 | Gap (2) | 2 | 3 |
FIG. 7A
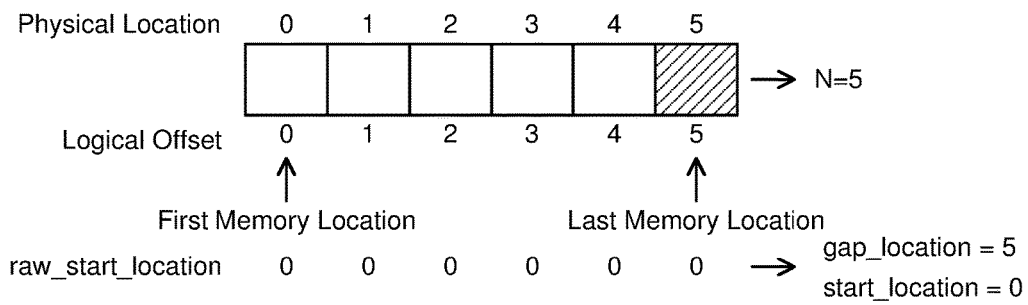
FIG. 7B
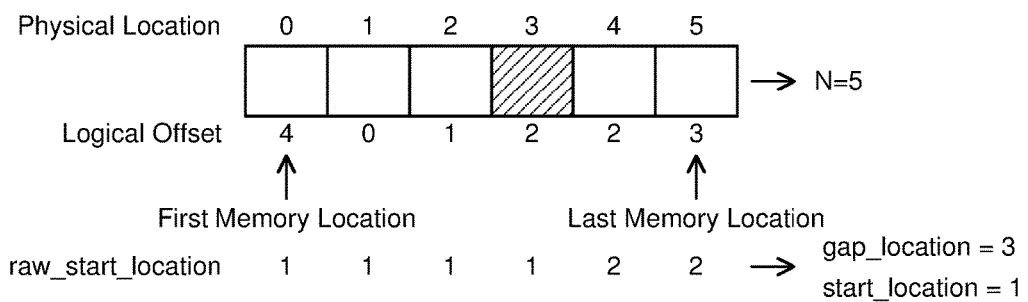
FIG. 7C

METHOD AND SYSTEM FOR RECOVERING STORAGE OBJECT RECORDS IN SOLID STATE MEMORY

BACKGROUND

Solid state memory storage devices may be used to store data. Such solid state storage devices may be based on solid state memory such as, for example, NAND Flash memory, NOR Flash memory, Phase Change Memory (PCM) and Spin Torque Magnetic Random Access memory, that degrades as data are written to the memory. Only a limited number of writes to solid state memory may thus be permissible before the solid state memory loses its ability to reliably retain data. Repeated writes to the same memory location may prematurely wear out the memory location, and wear level operations may, thus, be performed to distribute the wear across the solid state memory. Variables that track the wear level operations may be required to enable reading from and writing to solid state memory on which wear level operations are performed.

BRIEF DESCRIPTION OF DRAWINGS

FIGS. 7A-7C show an exemplary storage object as it undergoes wear level operations and as a corresponding storage object record is reconstructed from metadata in the storage object, in accordance with one or more embodiments of the technology.

DETAILED DESCRIPTION

Figure 1A:
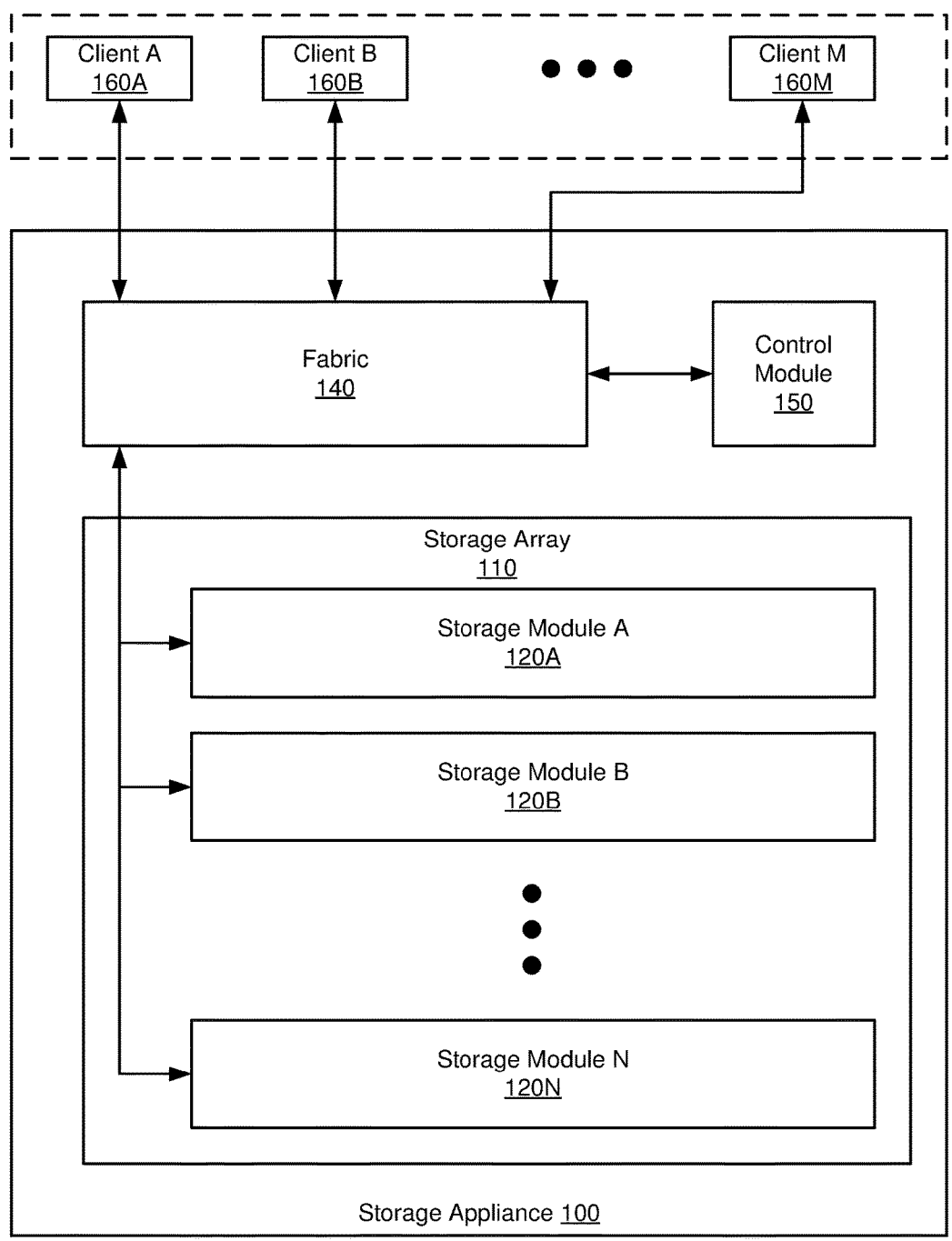
FIGS. 1A and 1B show systems, in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-7C, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to reducing uneven wear of solid state memory. Uneven wear may result from some data being written to memory locations of the solid state memory region more frequently than other data being written to other memory locations. Repetitive writes to a memory location may ultimately result in failure of that memory location. Only a limited number of writes to solid state memory may thus be permissible to a memory location before the memory location loses its ability to reliably retain data. The permissible number of writes or program-erase cycles of a single memory location in solid state memory may be reported as a write endurance, e.g., in thousands or millions of writes or program-erase cycles. While repeated writes to the same memory location may prematurely wear out the memory location, other memory locations of the solid state memory may still be intact. Accordingly, the methods and systems described below aim to reduce uneven wear resulting from repeated writes to particular memory locations by periodically performing wear level operations. The wear level operations relocate data within the memory region to avoid that frequently written data are always written to the same memory locations. Variables that track the wear level operations may be required to enable reading from and writing to solid state memory for which wear level operations are performed. These variables, in accordance with one or more embodiments of the technology, are stored in volatile memory, e.g., in random access memory (RAM). Accordingly, these variables may be lost if a power interruption occurs or when a system restart is performed. In one embodiment of the technology, wear-level operation tracking variables may be restored from metadata that are stored along with the actual data in the solid state memory. Accordingly, a recovery from a power failure is possible even though the wear-level operation tracking variables themselves are not stored in non-volatile memory.

Figure 1B:
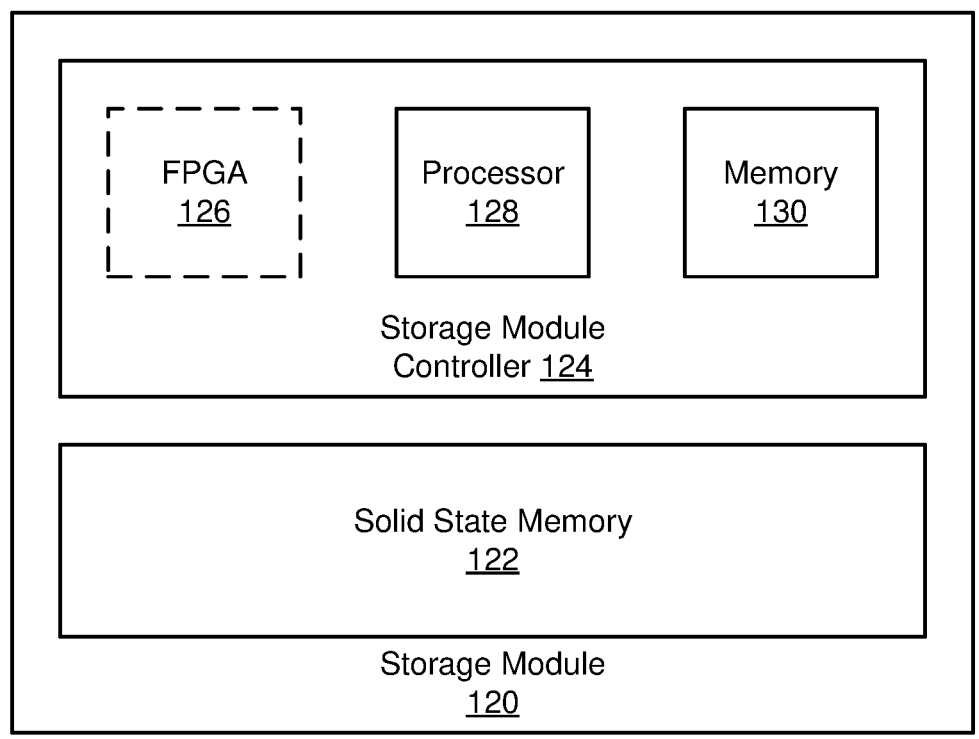

FIGS. 1A and 1B show systems in accordance with one or more embodiments of the technology. Referring to FIG. 1A, the system includes one or more clients (client A (160A)-client M (160M)) that are operatively connected to a storage appliance (100).

In one embodiment of the technology, the clients (160A-160M) may be any type of physical system that includes functionality to issue a read request to the storage appliance (100) and/or to issue a write request to the storage appliance (100). Though not shown in FIG. 1A, each of the clients (160A-160M) may include a client processor (not shown), client memory (not shown), and any other software and/or hardware necessary to implement one or more embodiments of the technology.

In one embodiment of the technology, the clients (160A-160M) are configured to execute an operating system (OS) that includes a file system, a block device driver, an application programming interface (API) to enable the client to access the storage appliance, and/or a user programming library. The file system, the block device driver and/or the user programming library provide mechanisms for the storage and retrieval of files from the storage appliance (100). More specifically, the file system, the block device driver and/or the user programming library include functionality to perform the necessary actions to issue read requests and write requests to the storage appliance. They may also provide programming interfaces to enable the creation and deletion of files, reading and writing of files, performing seeks within a file, creating and deleting directories, managing directory contents, etc. In addition, they may also provide management interfaces to create and delete file systems. In one embodiment of the technology, to access a file, the operating system (via the file system, the block device driver and/or the user programming library) typically provides file manipulation interfaces to open, close, read, and write the data within each file and/or to manipulate the corresponding metadata.

In one embodiment of the technology, the clients (160A-160M) interface with the fabric (140) of the storage appliance (100) to communicate with the storage appliance (100), as further described below.

In one embodiment of the technology, the storage appliance (100) is a system that includes persistent storage such as solid state memory, and is configured to service read requests and/or write requests from one or more clients (160A-160M).

The storage appliance (100), in accordance with one or more embodiments of the technology, includes one or more storage modules (120A-120N) organized in a storage array (110), a control module (150), and a fabric (140) that interfaces the storage module(s) (120A-120N) with the clients (160A-160M) and the control module (150). Each of these components is described below.

The storage array (110), in accordance with an embodiment of the technology, accommodates one or more storage modules (120A-120N). The storage array may enable a modular configuration of the storage appliance, where storage modules may be added to or removed from the storage appliance (100), as needed or desired. A storage module (120), in accordance with an embodiment of the technology, is described below, with reference to FIG. 1B.

Continuing with the discussion of the storage appliance (100), the storage appliance includes the fabric (140). The fabric (140) may provide connectivity between the clients (160A-160M), the storage module(s) (120A-120N) and the control module (150) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the technology is not limited to the aforementioned protocols.

Further, in one or more embodiments of the technology, the storage appliance (100) includes the control module (150). In general, the control module (150) is a hardware module that may be configured to perform administrative tasks such as allocating and de-allocating memory regions in the solid state memory modules (120A-120N) and making allocated memory regions accessible to the clients (160A-160M). Further, the control module may perform one or more steps to balance the wear within a memory region and/or to migrate the content of a worn memory region to a different memory region. In one embodiment of the technology, these and related functions (e.g., one or more of the steps described in FIGS. 3-6) are performed by the control module (150).

The control module (150) interfaces with the fabric (140) in order to communicate with the storage module(s) (120A-120N) and/or the clients (160A-160M). The control module may support one or more of the following communication standards: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE), or any other communication standard necessary to interface with the fabric (140).

FIG. 1B shows a storage module, in accordance with one or more embodiments of the technology. The storage module (120) includes solid state memory (122) to persistently store data. In one embodiment of the technology, the solid state memory (122) of the storage module (120) may include, but is not limited to, NAND Flash memory, NOR Flash memory, Spin Torque Magnetic Random Access Memory (ST-RAM) and Phase Change Memory (PCM).

Generally, the solid state memory (122) may correspond to any type of memory that has a finite number of program-erase cycles or write cycles. In one or more embodiments of the technology, the limited number of program-erase or write cycles necessitates the use of methods to avoid excessive writes to the same region of the solid state memory in order to prevent data loss, as described in detail below.

Continuing with the discussion of the storage module (120), shown in FIG. 1B, the storage module (120), in accordance with one or more embodiments of the technology, further includes a storage module controller (124). In one embodiment of the technology, the storage module controller (124) is configured to receive and service requests to read from and/or write data to the solid state memory (122). These requests may originate from the clients (160A-160M) or from the control module (150), and may be conveyed to the storage module controller (124) via the fabric (140). Further, the storage module controller (124) may perform or may support administrative tasks including the methods described in FIGS. 3-6.

In one embodiment of the technology, the storage module controller (124) includes a processor (128) (e.g., one or more cores, or micro-cores of a processor that are configured to execute instructions) and memory (130) (e.g., volatile memory that may be, but is not limited to, dynamic random-access memory (DRAM), synchronous DRAM, SDR SDRAM, and DDR SDRAM) to perform at least one of the steps described in FIGS. 3-6. Alternatively or additionally, the storage module controller (124) may include a field-programmable gate array (FPGA) and/or an application-specific integrated circuit (ASIC) (126). In a storage module controller that includes an FPGA and/or ASIC and a processor, the FPGA and/or ASIC may primarily service read and write requests, whereas the processor may handle or support administrative tasks, including those related to wear leveling and/or data migration, as further described below.

One skilled in the art will recognize that the architecture of the system is not limited to the components shown in FIGS. 1A and 1B. For example, the components of the storage appliance (100) may include any number of storage modules (120A-120N). Further, the storage module controller (124) of the storage module (120) and the control module (150) of the storage appliance (100) may be equipped with central processing units (CPUs), field-programmable gate arrays (FPGAs), application-specific integrated circuits (ASICs) and/or any other type of processor, without departing from the technology. In addition, the fabric may be based on communication standards other than those discussed above, without departing from the technology.

Figure 2A:
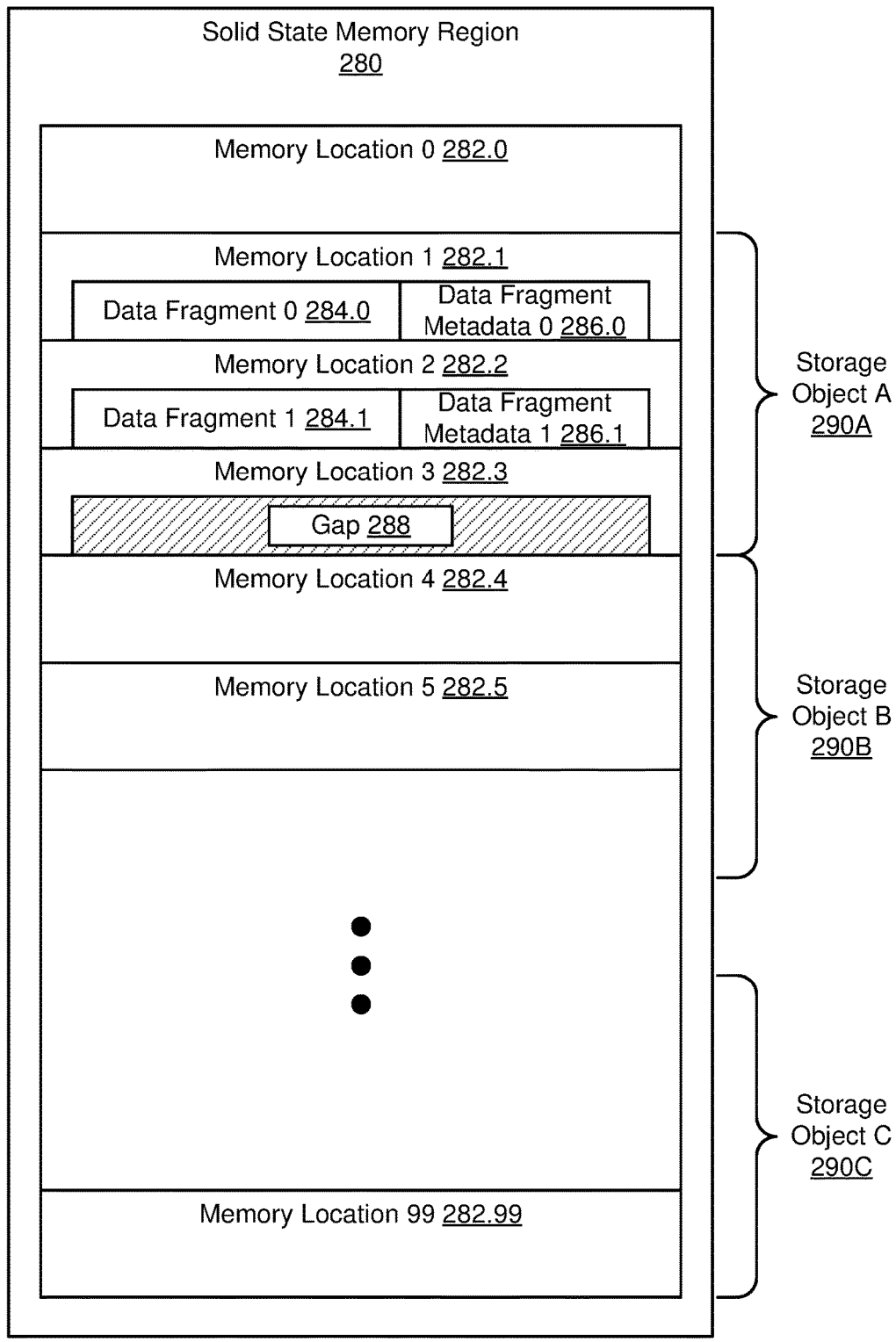
FIGS. 2A-2D show an organization of solid state memory, in accordance with one or more embodiments of the technology.

FIGS. 2A-2D show an organization of solid state memory, in accordance with one or more embodiments of the technology. FIG. 2A shows an exemplary physical representation of data in a solid state memory region (280). The solid state memory region (280) may be a memory region allocated in the solid state memory (122) of a storage module (120) and may be used to accommodate data. Data in the solid state memory region (280) may be stored as data fragments (284) in memory locations (282) of the solid state memory region (280). The exemplary solid state memory region in FIG. 2A includes 100 memory locations (282.0-282.99) to accommodate 100 data fragments. Each memory location may be a sub region of a specified size, in the solid state memory region. A memory location may include a specified number of bits (e.g., if a memory location is configured to store a single variable only), or it may span larger regions, e.g., bytes, kilobytes, megabytes, etc. The size of a memory location may also be specific to the type of solid state memory being used. In one embodiment of the technology, a memory location is the smallest individually addressable memory unit in the solid state memory region (280). A memory location may be occupied by a data fragment (e.g., data fragments 0 and 1 (284.0 and 284.1) at memory locations 1 and 2, respectively), or it may be empty (e.g., memory location 99 (282.99). A combination of data fragments may form a storage object, e.g., a data file. The data fragments of a storage object may or may not be in consecutive order and/or they may be interrupted by one or more gaps. Further, the order and/or location of the data fragments may change over time, e.g., when a wear level operation is performed. In the exemplary solid state memory region (280), data stored at memory locations 1, 2 and 3 (282.1-282.3) form storage object A (290A). Each memory location associated with storage object A includes either: a data fragment and metadata (data fragment 0 (284.0) and metadata 0 (286.0) at memory location 1 (282.1), and data fragment 1 (284.1) and metadata 1 (286.1) at memory location 2 (282.2)), or a gap (the gap (288)) at memory location 3 (282.3)). A detailed description of a storage object is provided in FIG. 2B. The solid state memory region (280) further includes the additional storage objects B and C (290B and 290C).

One skilled in the art will recognize that solid state memory regions are not limited to the exemplary solid state memory region shown in FIG. 2A. For example, the size and/or the organization of the solid state memory region may vary, and a solid state memory region may further include any number of storage objects, without departing from the technology.

Figure 2B:
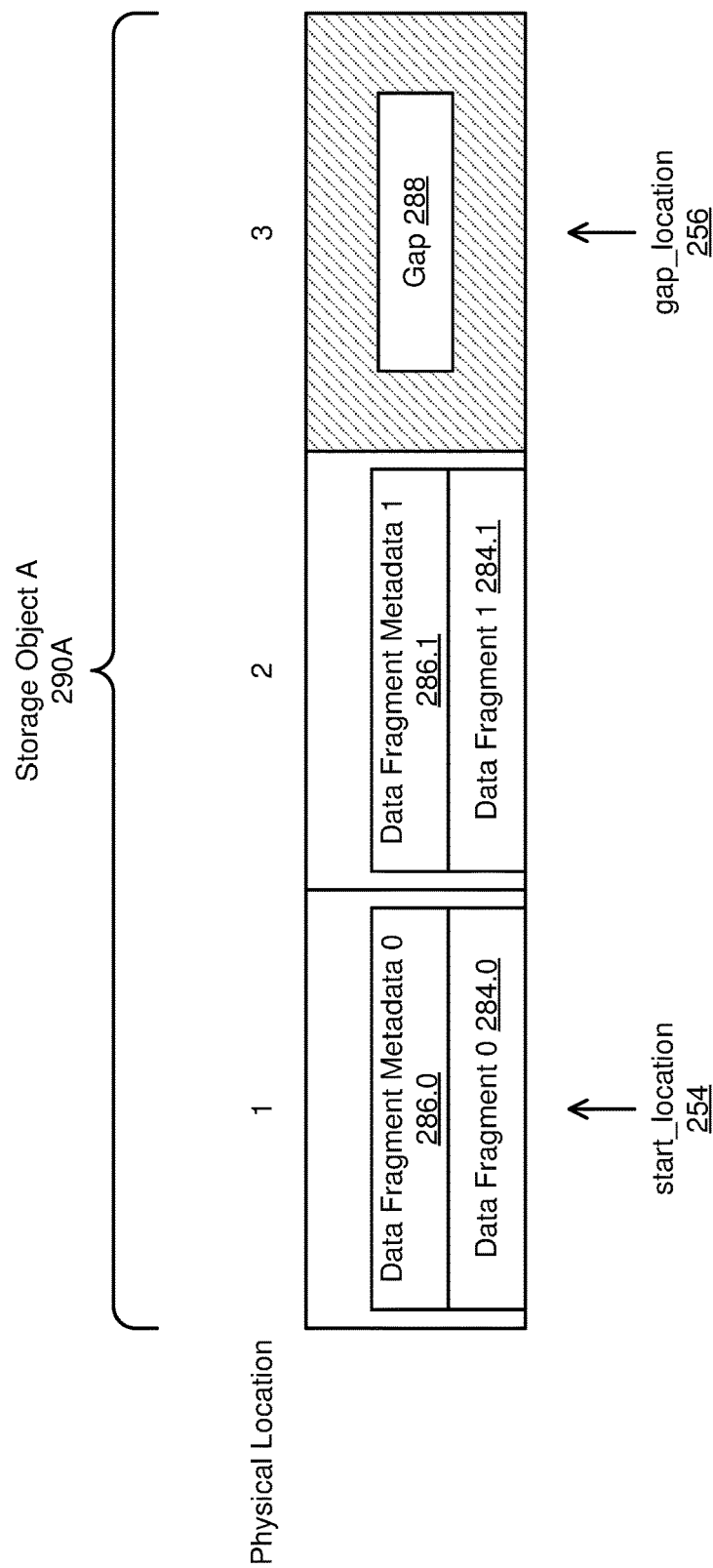

FIG. 2B shows an exemplary storage object, in accordance with one or more embodiments of the technology. Storage object A (290A) is the storage object previously shown in FIG. 2A. It occupies three memory locations at physical locations 1, 2 and 3. The storage object includes two data fragments (data fragment 0 (284.0) and data fragment 1 (284.1), stored at physical locations 1 and 2. These data fragments, in accordance with an embodiment of the technology, are actual data to be stored, e.g., user data, program code, etc. The exemplary data storage object that includes two data fragments therefore is considered to have a length "2" (N=2). Each data fragment is accompanied by metadata. Accordingly, storage object 1 includes metadata 0 and metadata 1. (286.0 and 286.1). These metadata may provide labeling of the data fragment as further described in FIG. 2D. The storage object also includes a gap (288), at physical location 3. The gap, in accordance with an embodiment of the technology, is used when performing wear level operations that are applied to the storage object to mitigate the effects of uneven wear.

Consider, for example, frequent writes of data fragment 1 (284.1). Without wear level operations being performed, this may result in premature wear of physical location 2, while the other physical locations 1 and 3 may remain largely unworn. The wear may be reduced by periodically shifting the content stored at the physical location to a different physical location. For example, after a number of writes have been performed to physical location 1, data fragment 0 (284.0) and metadata 0 (286.0) may be relocated to physical location 2, whereas the gap may be relocated to physical location 1 (thus essentially swapping positions). In one embodiment of the technology, relocating the gap involves copying the data fragment and the data fragment metadata from the physical location that is to become the gap to the physical location that currently is the gap. The physical location from where the data fragment and the data fragment metadata were copied then becomes the gap. However, the data fragment and the data fragment metadata may not be deleted from the physical location that became the gap. Thus, even though this physical location is considered the gap, it may still contain a copy of the data fragment and the data fragment metadata.

Subsequent writes of data fragment 1 may thus result in the wear of physical location 3, which is still fresh, in comparison to physical location 2. If the process of swapping the gap (288) with an adjacent data fragment and metadata is repeatedly performed, the wear resulting from the writing of data fragments, even if performed for a few or a single data fragments only, is distributed across the physical locations of the storage object.

To continuously perform wear level operations, the storage object is treated as a circular structure. In other words, once the gap reaches the first physical location of the storage object, the next wear level operation may relocate the gap to the last physical location of the storage object.

In one embodiment of the technology, the gap_location variable (256) is used to track the location of the gap (288). Further, a start_location variable (254) is used to keep track of how many times all memory fragments of the storage objects have been relocated, as a result of the execution of wear level operations. The start_location (254) and the gap_location (256), in accordance with an embodiment of the technology, uniquely establish the location of all data fragments and metadata at physical memory locations, after any number of wear level operations having been performed. Accordingly, the start_location (254) and the gap_location (256) may be used to identify the correct physical location for a data fragment to be read/written, at any time, as further described in FIGS. 5 and 6. Availability of accurate start_location and gap_location variables (254 and 256) at any time may therefore be critical for the performance of read and write operations.

In one embodiment of the technology, a storage object may be initialized prior to writing actual data fragments to the storage object. The initialization may include writing at least the data fragment metadata of the first and the last element of the storage object. Accordingly, the exemplary storage object in FIG. 2B may merely include data fragment metadata at physical locations 1 and 3, but not at physical location 2. Further, none of the physical memory locations may include a data fragment, immediately after initialization.

Those skilled in the art will appreciate that the technology is not limited to the exemplary storage object shown in FIG. 2B. A storage object may be of any size (e.g., including any number of physical locations in a solid state memory region). Further, a storage object may be located anywhere in the solid state memory region. In addition, wear level operations may be performed using a leftward or rightward shifting gap, without departing from the technology.

Figure 2C:
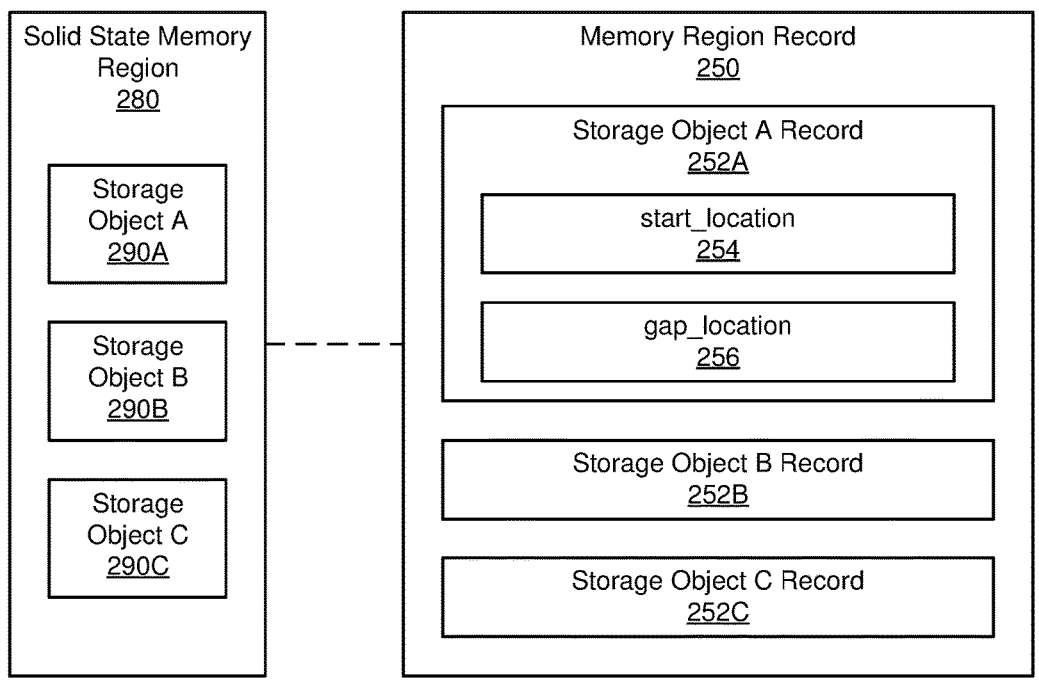

FIG. 2C shows solid state memory region (280) and an associated memory region record (250). The solid state memory region may be of any size and may be structured in any way, e.g., similar to the exemplary memory region shown in FIG. 2A. The solid state memory region (280) may be addressed and maintained using elements of the memory region record (250). For each storage object (290) in the solid state memory region (280), a corresponding storage object record (252) exists in the memory region record (250). While the exemplary memory region of FIG. 2A, described here, only includes three storage objects and three corresponding storage object records, a memory region may have any number of storage objects with corresponding storage object records in the memory region record. Each storage object record includes the variables start_location (254) and gap_location (256) that are specific to the corresponding storage object (290). As previously described, start_location and gap_location may be used to locate the correct physical locations at which data is to be stored or from which data is to be retrieved, in the presence of wear level operations that cause periodic sifts of the data, in the physical locations. In one embodiment of the technology, the storage object records (252) are stored in volatile memory, e.g., in random access memory (RAM) of the control module (150) or the storage module controller (124). Accordingly, a power loss may result in the loss of the storage object records (252). In one or more embodiments of the technology, the storage object records (252) may be reconstructed, e.g., after a power loss, from data fragment metadata (286), as described in FIGS. 3 and 4.

Figure 2D:
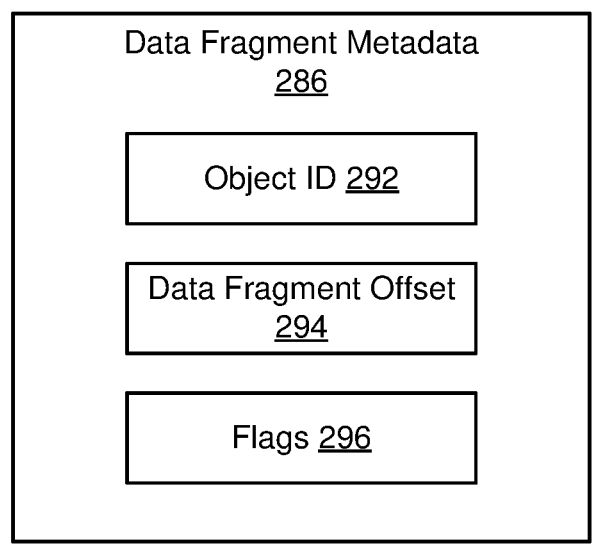

Turning to FIG. 2D, data fragment metadata is shown. Each data fragment (284), written to a memory location, identified by a physical location, is accompanied by data fragment metadata (286) as illustrated, for example, in FIGS. 2A and 2B. In one embodiment of the technology, the data fragment metadata (286) include an object ID (292), a data fragment offset (294) and flags (296). Each of these elements is subsequently described.

The object ID (292) is unique to the storage object with which the data fragment metadata are affiliated. Any data fragment metadata that is affiliated with the same storage object thus includes the same object ID. The object ID (292) may be, for example, an alphanumeric identifier, or any other type of identifier that enables the distinction of different storage objects. In one embodiment of the technology, the object ID (292) is persistent. In other words, as long as the object exists, the object ID will remain.

The data fragment offset (294) identifies the offset of the memory location at which a data fragment and the accompanying data fragment metadata are stored, measured from the first memory location that is occupied by the storage object. Consider, for example, the exemplary storage object shown in FIG. 2B. The first data fragment (data fragment 0) is stored at physical location 1. In the associated data fragment metadata, the data fragment offset (294) is "0", because there is no offset from the location of the first data fragment. However, in the data fragment metadata that accompanies data fragment 1, the data fragment offset (294) is "1" because the physical location 2, at which data fragment 1 is stored, is located one above the first data fragment at physical location 1. Further, at the gap location (physical location 3) the data fragment offset in the metadata would be "2".

In one embodiment of the technology, the data fragment offset (294) is persistent. As previously described, if a data fragment is moved, e.g., as a result of a wear level operation, the associated data fragment metadata also move. Accordingly, while the data fragment offset may initially (immediately after the storage object is written or at least initialized) correctly show the offset with respect to the physical location at which the first data fragment of the storage object is stored, after the execution of wear level operations (causing the shift of data fragments, including the associated metadata), the data fragment offset may no longer accurately describe the current offset with respect to the physical location of the first data fragment. In other words, the data fragment offset describes an initial offset, at the time when the storage object is created. The data fragment offset, however, does not necessarily describe the current offset of the data fragment with which it is associated, after wear level operations have been performed.

The flags (296) may be used to indicate the status of the associated data fragment. For example, there may be a flag that indicates whether the data fragment is valid. Such a flag may be a bit, a string, or any other variable suitable for the use as a flag. The flag may be updated at any time, for example when the data fragment that the data fragment metadata is associated with becomes invalid. The metadata of an invalid data fragment may thus be similar to the metadata of a valid data fragment, except for the flag indicating that the data fragment is invalid. Further, there may be a flag that indicates whether a memory location is assigned or unassigned. For example, when a solid state memory region is initialized, prior to its use, all memory locations may be flagged as unassigned, and subsequently the flags of those memory locations that are reserved for a storage object may be changed to assigned.

Figure 3:
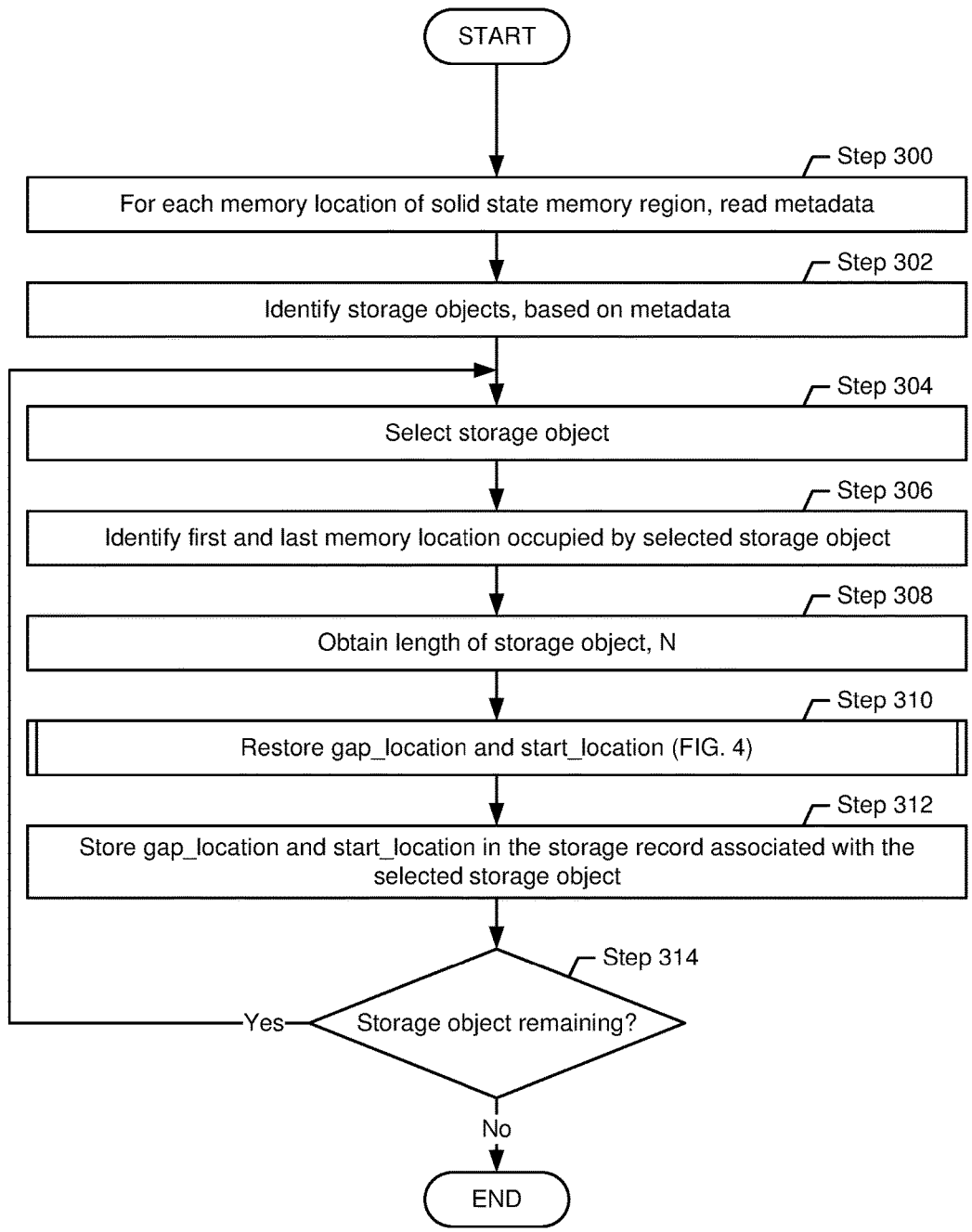
FIGS. 3 and 4 show flowcharts that describe the recovery of storage object records, in accordance with one or more embodiments of the technology.
Figure 4:
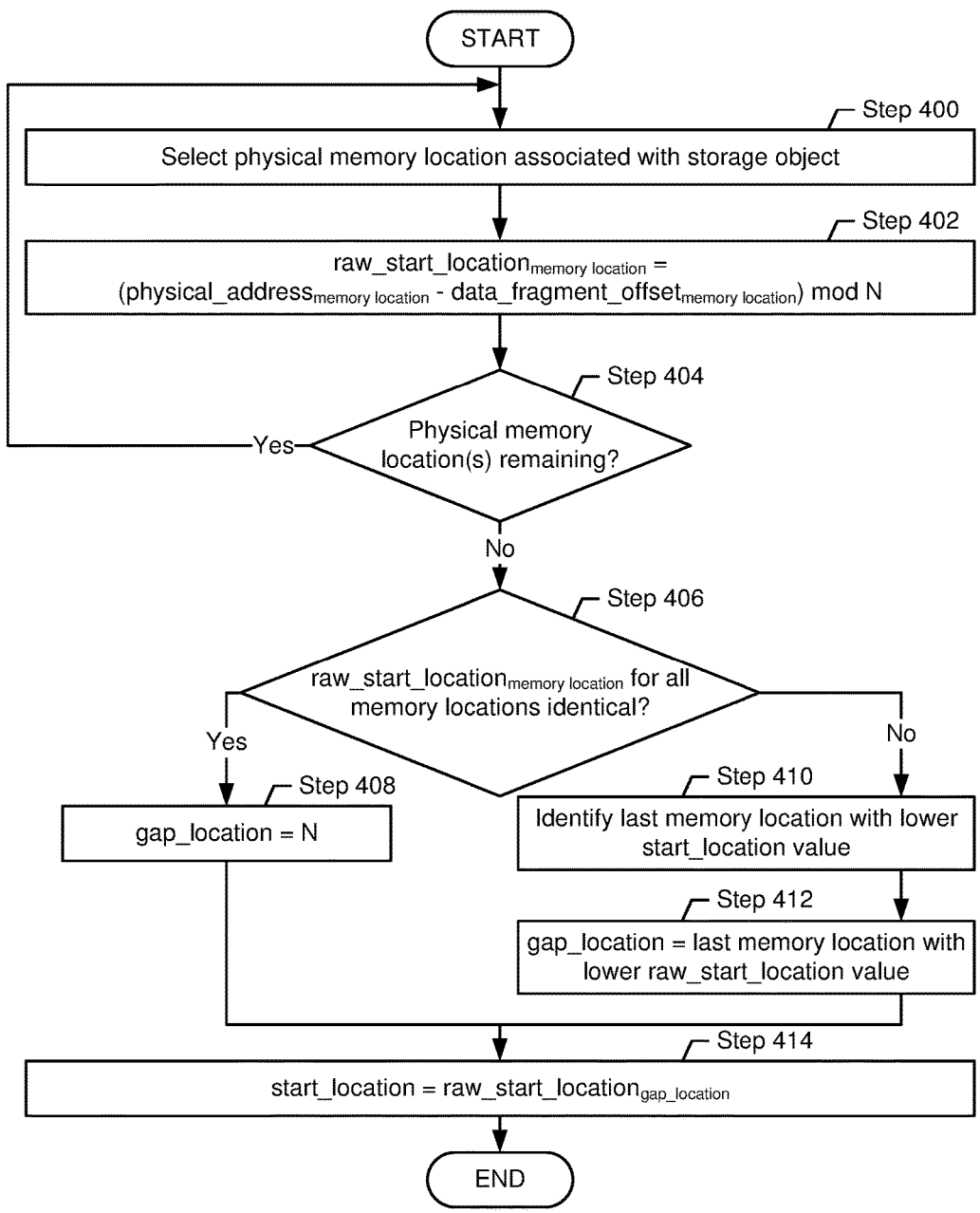

FIGS. 3-6 show flowcharts in accordance with one or more embodiments of the technology. FIGS. 3 and 4 describe the recovery of storage object records from data fragment metadata, and FIGS. 5 and 6 describe the use of the recovered storage object records to perform read and/or write operations. Use cases are provided below to illustrate, in detail, how the methods of FIGS. 3-6 may be executed.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 3-6 may be performed in parallel with any other steps shown in FIGS. 3-6 without departing from the technology.

Turning to FIG. 3, a method for recovering storage object records is shown. The method may be performed when a storage system is recovering from a power failure. At this point, the storage system no longer has valid storage object records in memory and read and/or write operations as described in FIGS. 5 and 6 can therefore not be performed.

Once the storage object records are restored, after completion of the method of FIG. 3, read and/or write operations may again be performed.

In Step 300, for each memory location of the solid state memory region, the data fragment metadata is read. In one embodiment of the technology, at least the object ID is obtained from each memory location.

In Step 302, the storage objects, stored in the memory region, are identified.

The identification, in accordance with an embodiment of the technology is performed based on the object IDs obtained in Step 300.

In Step 304, one of the identified storage objects is selected for further processing.

In Step 306, the first and the last physical memory location of the selected storage object are identified. The identification may be performed based on the object IDs obtained in Step 300. The first physical memory location (e.g., in ascending order) at which a particular object ID is found may be considered the first physical memory location of the selected storage object. Similarly, the last physical memory location at which the same object ID is found may be considered the last physical memory location of the selected storage object.

In Step 308, the length, N, of the selected storage object is obtained. The length may be obtained by subtracting the first memory location from the last memory location. Because the storage object includes a gap, the resulting length, N, is the length of the storage object, without the gap.

After execution of Steps 304-308, the location and the size of the selected storage object is known. However, the location of individual data fragments of the storage object and the location of the gap is still unknown.

In Step 310, the variables gap_location and start_location are restored, as described in FIG. 4. The availability of gap_location and start_location enable the exact location of each data fragment of the storage object, as necessary for the performance or read and/or write operations, as described in FIGS. 5 and 6.

In Step 312, gap_location and start_location are stored in the storage object record associated with the selected storage object.

In Step 314, a determination is made about whether additional identified storage objects are remaining. If additional storage objects are remaining, Step 304-312 may be repeated for these additional storage objects, until the reconstruction of the wear level variables gap_location and start_location has been completed for all storage objects.

FIG. 4 shows a method for reconstructing the variables gap_location and start_location, in accordance with one or more embodiments of the technology.

In Step 400, a physical memory location, associated with the selected storage object, is selected.

In Step 402, a raw_start_location variable is obtained for the selected physical memory location. raw_start_location is calculated by subtracting the data fragment offset from the physical address of the selected memory location, and by applying a modulo N operation to the subtraction result. The data fragment offset of the selected memory location may be obtained from the data fragment metadata, stored at the selected memory location.

In Step 404, a determination is made about whether additional physical memory locations, associated with the selected storage object, are remaining. If additional physical memory locations are remaining, the method may return to Step 400 to repeat Steps 400 and 402, until these steps have been completed for all physical memory locations of the selected storage object. As a result, a raw_start_location variable may then be available for each of the physical memory locations that are associated with the selected storage object.

In Step 406, a determination is made whether the values of raw_start_location are identical, for all physical memory locations. If raw_start_location is identical, for all physical memory locations, gap_location is set to N, in Step 408. If a determination is made that not all values of raw_start_location are identical, the method may proceed to Step 410.

In Step 410, the memory locations where raw_start_location increases from a lower value to a higher value are identified.

In Step 412, gap_location is set to the last memory location, in ascending order, at which raw_start_location has the lower value, as identified in Step 410.

In Step 414 the start_location is set to the value of raw_start_location at the location of the gap, as identified in Step 412.

Accordingly, after completion of Step 414, all variables (i.e., start_location and gap_location) are available to fully restore the storage object record for the selected storage object.

Figure 5:
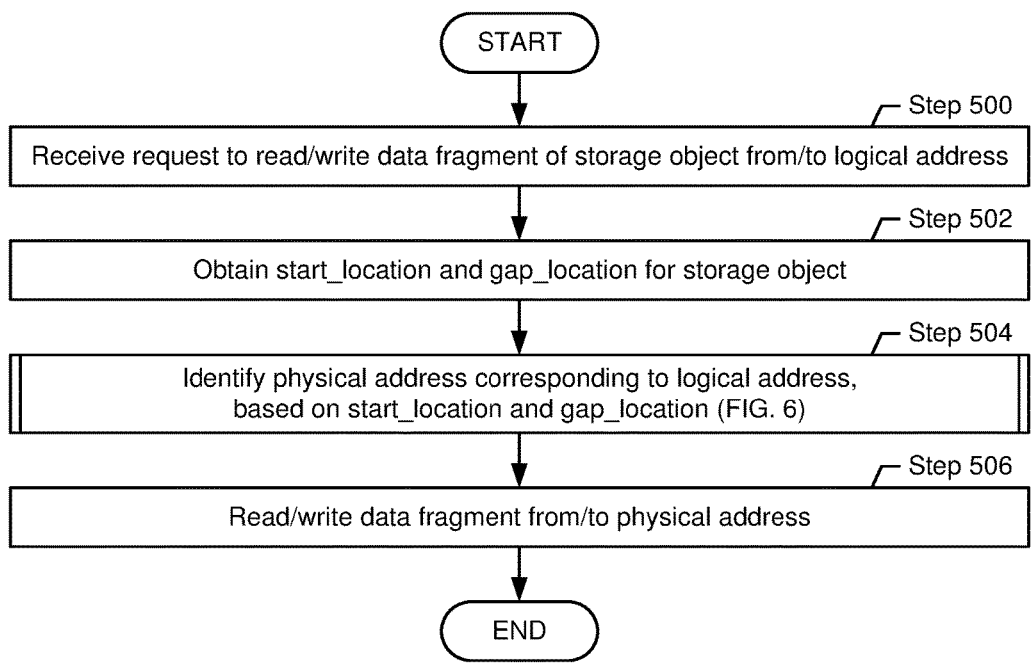
FIGS. 5 and 6 show flowcharts that describe the execution of read and write operations from and to solid state memory, respectively, in accordance with one or more embodiments of the technology.

Turning to FIG. 5, FIG. 5 shows a method for reading and/or writing data fragments from and/or to solid state memory. While not specifically shown, the execution of write operations may occasionally trigger the execution of wear level operations, resulting in changes in the configuration of the memory region, as previously described, and as further illustrated in the uses cases discussed below.

In Step 500, a read or write request to read/write a data fragment of a storage object from/to a solid state memory region is received. The request may use a logical address to indicate the memory location to be addressed. The request may have been received from a client attempting to read/write from/to the solid state memory of the storage appliance. The request may be received by the storage appliance and may reach the storage module controller of the storage module from/to which the client is attempting to read/write.

In Step 502, the variables start_location and gap_location are obtained for the storage object.

In Step 504, the physical address that corresponds to the logical address, based on start_location and gap_location, is identified. The details are described in FIG. 6.

In Step 506, the data fragment is read from/written to the physical address. Writing the data fragment may include updating the data fragment metadata. For example, a flag in the metadata may be updated from "invalid", "unused" or "unassigned" to "valid". Further, the object ID may be written, in the metadata. Alternatively, if the write request involves the deletion of a data fragment, the flag may be updated from "valid" to "invalid". Reading the data fragment may include inspecting the metadata to determine whether the targeted memory location includes valid data. For example, if the associated data fragment metadata includes a flag that indicates that the memory location is "invalid", "unused" or "unassigned", an error message or zeros may be returned, whereas the data fragment may be returned if the flag indicates that the data is valid.

Figure 6:
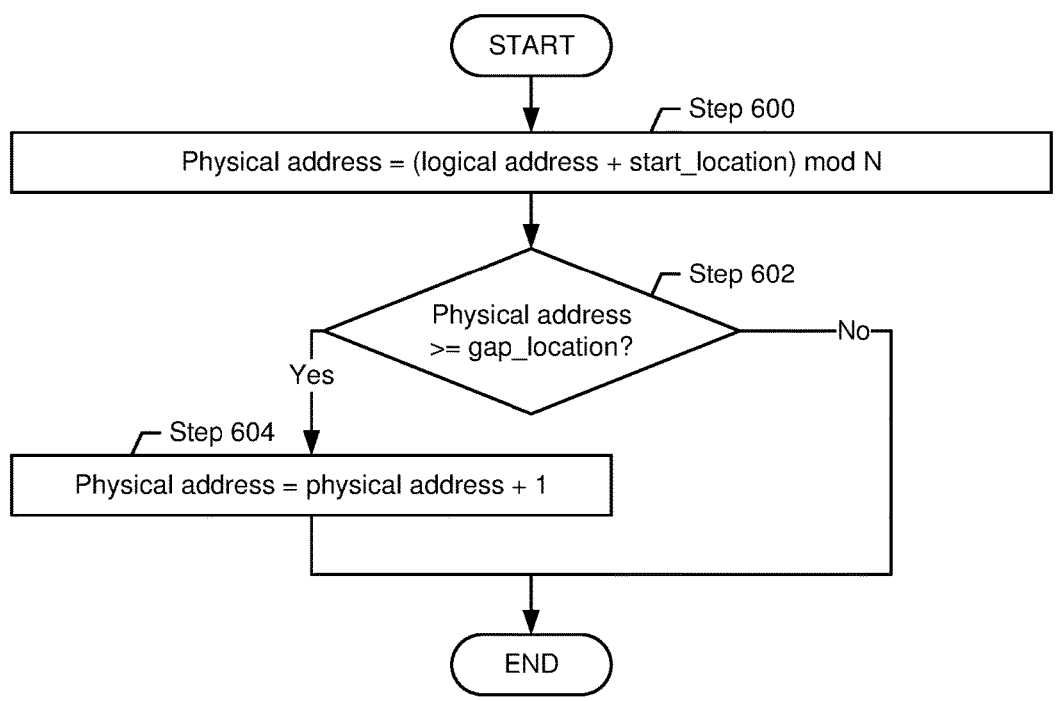

Turning to FIG. 6, a method for identifying a physical address, based on a provided logical address, is described.

In Step 600, the physical address is determined by adding start_location to the logical address, and by applying a modulo N operation to the sum.

In Step 602, a determination is made about whether the physical address, obtained in Step 600 is equal to or greater than gap_location. If so, the method may proceed to Step 604, where the physical address is incremented by one.

Example Use Case

The use case scenario described below is intended to provide an example of the method for recovering a storage object record, e.g., after a power failure, from the data fragment metadata of the storage object, as described in FIGS. 3 and 4, and is for illustrative purposes only. The use case scenario is based on a system similar to the one shown in FIG. 1, in which data is written to/read from a memory region of a solid state memory module, where a storage object is stored. One skilled in the art will recognize that the methods described in FIGS. 3 and 4 are not limited to the use case scenario described below, but rather are universally applicable to a wide range of solid state memory-based systems of different configuration, complexity and size.

Consider a scenario in which wear level operations are periodically performed for the storage object. The configuration of the storage object, as these wear level operations are performed changes as shown in FIG. 7A. In FIG. 7A, a storage object that occupies the physical addresses 0-5 of the memory region is shown. The storage object includes five data fragments and a gap. The original configuration, prior to the execution of a first wear level operation, is shown in row 1 of FIG. 7A. For each physical address location, data_fragment_offset for each of the data fragments is shown. Because no wear level operation has been performed, data_fragment_offset for each data fragment is aligned with the physical location. In other words, for the first data fragment, at physical address 0, data_fragment_offset=0, for the second data fragment at physical address 1, data_fragment_offset=1, etc. For the gap a physical address 5, data_fragment_offset=5. The second row of FIG. 7A shows the storage object after the first wear level operation has been performed. The data fragment that was previously located at physical address 4 is copied to physical address 5, and the memory location identified by physical address 4 is declared the gap. As a result, for the fourth data fragment, now located at physical address 5, data_fragment_offset=4. Subsequent rows in FIG. 7A show how the configuration of the storage object changes as additional wear level operations are performed. Whenever the configurations of the storage object changes, the storage object record is updated. Specifically the variables start_location and gap_location are updated. For example, for the first row, start_location=0, and gap_location=5; for the second row, start_location=0 and gap_location=4, etc.

At any point in time, i.e., for any of the configurations of the storage object, power may fail and, thus, start_location and gap_location may be lost. For two configurations, highlighted using dashed rectangles, the recovery of start_location and gap_location are now described. Specifically, FIG. 7B describes the recovery of the configuration marked by the upper dashed rectangle, and FIG. 7C describes the recovery of the configuration marked by the lower dashed rectangle.

In FIG. 7B, the metadata of the entire solid state memory region have been read to determine that only physical locations 0-5 are occupied by the storage object. Further, it is determined that physical location 0 is the first memory location with the object ID corresponding to the storage object, and that physical location 5 is the last memory location with the object ID corresponding to the storage object. Accordingly N=5. Next, raw_start_location is calculated for all memory locations. raw_start_location=0 for all memory locations, and accordingly, gap_location=5 and start_location=0. The storage object record has been successfully restored, and read and/or write operations as described in FIGS. 5 and 6 can, thus, be performed.

In FIG. 7C, the metadata of the entire solid state memory region have again been read to determine that only physical locations 0-5 are occupied by the storage object. Further, it is determined that physical location 0 is the first memory location with the object ID corresponding to the storage object, and that physical location 5 is the last memory location with the object ID corresponding to the storage object. Accordingly N=5. Next, raw_start_location is calculated for all memory locations. raw_start_location=1 for memory locations 0-3, and raw_start_location=2 for memory locations 4 and 5. Accordingly, gap_location=3 and start_location=1. The storage object record has been successfully restored, and read and/or write operations as described in FIGS. 5 and 6 can, thus, be performed.

Those skilled in the art will appreciate that the technology is not limited to the examples described above.

Embodiments of the technology may enable solid state storage systems to restore wear level variables, e.g., after a power loss. Yet, solid state storage systems in accordance with one or more embodiments of the technology do not require the storage of the wear level variables in non-volatile memory. No separate table that requires periodic updating and that could limit performance is necessary either.

Embodiments of the technology may be implemented using limited resources. Specifically, only small amounts of data fragment metadata, associated with the data fragments of a storage object, may be necessary to allow restoration of the wear level variables at any time.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for recovering storage object records in solid state memory comprising:
 for each memory location of a solid state memory region, reading data fragment metadata;
 identifying, based on the data fragment metadata, a storage object, wherein the storage object occupies a subset of memory locations of the solid state memory region;
 identifying a first memory location and a last memory location of the subset of memory locations; and
 restoring a storage object record for the storage object, wherein the storage object record comprises variables that enable a logical to physical address translation for the storage object, wherein restoring the storage object record for the storage object comprises:
 for each memory location of the subset of memory locations:
 obtaining a raw start location based on a physical address of a memory location of the subset of memory locations and a data fragment offset;
 determining a gap location and a start location based on the raw start location obtained for the memory location; and
 storing the gap location and the start location in the storage object record.

2. The method of claim 1, further comprising:
 receiving a request to read a memory fragment of the storage object, wherein the read request specifies a second memory location of the subset of memory locations, specified using a logical address;

translating the logical address into a second physical address using the variables in the storage object record for the storage object; and reading the memory fragment from the second memory location using the physical address.

3. The method of claim 1, further comprising:

performing a wear level operation to balance the wear of the subset of memory locations; and updating the storage object record.

4. The method of claim 1, wherein the start location for the memory location is configured to track a progression of wear level operations performed for the memory location, wherein the gap location specifies the memory location of the subset of memory locations, and wherein the gap location is reserved for performing the wear level operations.

5. The method of claim 1, wherein the data fragment metadata for the memory location comprises:

an object ID that uniquely identifies the storage object; and a data fragment offset that specifies an initial offset of an associated data fragment relative to the first memory location.

6. The method of claim 1, wherein determining the gap location comprises making a determination that the raw start location for each memory location is identical, and based on that determination, setting the gap location to the last memory location of the subset of memory locations.

7. The method of claim 1, wherein determining the gap location comprises making a determination that the raw start locations are segmented into a first set of raw start locations with a lower value and a second set of raw start locations with a higher value, and when the raw start locations are segmented into the first set of raw start locations with the lower value and the second set of raw start locations with the higher value:

setting the gap location to the memory location associated with the last raw start location in the first set of raw start locations.

8. A system comprising:

a storage module comprising a storage module controller and solid state memory, wherein the storage module controller:

reads data fragment metadata for each memory location of a solid state memory region in the solid state memory;

identifies, based on the data fragment metadata, a storage object, wherein the storage object occupies a subset of memory locations of the solid state memory region;

identifies a first memory location and a last memory location of the subset of memory locations; and restores a storage object record for the storage object, wherein the storage object record comprises variables that enable a logical to physical address translation for the storage object, wherein restoring the storage object record for the storage object comprises:

for each memory location of the subset of memory locations:

obtaining a raw start location based on a physical address of a memory location of the subset of memory locations and a data fragment offset;

determining a gap location and a start location based on the raw start locations obtained for the memory location; and storing the gap location and the start location in the storage object record.

9. The system of claim 8, wherein the start location for the memory location is configured to track a progression of wear level operations performed for the memory location, wherein the gap location specifies the memory location of the subset of memory locations, and wherein the gap location is reserved for performing the wear level operations.

10. The system of claim 8, wherein the data fragment metadata for the memory location comprises:

an object ID that uniquely identifies the storage object; and a data fragment offset that specifies an initial offset of an associated data fragment relative to the first memory location.

11. The system of claim 8, wherein determining the gap location comprises making a determination that the raw start location for each memory location is identical, and based on that determination, setting the gap location to the last memory location of the subset of memory locations.

12. The system of claim 8, wherein determining the gap location comprises making a determination that the raw start locations are segmented into a first set of raw start locations with a lower value and a second set of raw start locations with a higher value, and when the raw start locations are segmented into the first set of raw start locations with the lower value and the second set of raw start locations with the higher value:

setting the gap location to the memory location associated with the last raw start location in the first set of raw start locations.

13. A non-transitory computer readable medium comprising computer readable program code, which when executed by a computer processor enables the computer processor to:

read data fragment metadata, for each memory location of a solid state memory region;

identify, based on the data fragment metadata, a storage object, wherein the storage object occupies a subset of memory locations of the solid state memory region;

identify a first memory location and a last memory location of the subset of memory locations; and restore a storage object record for the storage object, wherein the storage object record comprises variables that enable a logical to physical address translation for the storage object, wherein restoring the storage object record for the storage object comprises:

for each memory location of the subset of memory locations:

obtaining a raw start location based on a physical address of a memory location of the subset of memory locations and a data fragment offset;

determining a gap location and a start location based on the raw start locations obtained for the memory location; and storing the gap location and the start location in the storage object record.

14. The non-transitory computer readable medium of claim 13, wherein the storage object record comprises:

wherein the start location for the memory location is configured to track a progression of wear level operations performed for the memory location, wherein the gap location specifies a memory location of the subset of memory locations, and wherein the gap location is reserved for performing the wear level operations.

15. The non-transitory computer readable medium of claim 13, wherein the data fragment metadata for the memory location comprises:

an object ID that uniquely identifies the storage object; and a data fragment offset that specifies an initial offset of an associated data fragment relative to the first memory location.

16. The non-transitory computer readable medium of claim 13, wherein determining the gap location comprises making a determination that the raw start location for each memory location is identical, and based on that determination, setting the gap location to the last memory location of the subset of memory locations.

17. The non-transitory computer readable medium of claim 13, wherein determining the gap location comprises making a determination that the raw start locations are segmented into a first set of raw start locations with a lower value and a second set of raw start locations with a higher value, and when the raw start locations are segmented into the first set of raw start locations with the lower value and the second set of raw start locations with the higher value:

setting the gap location to the memory location associated with the last raw start location in the first set of raw start locations.

\* \* \* \* \*